US008763107B1

(12) United States Patent
Jarrett, Jr.

(10) Patent No.: US 8,763,107 B1
(45) Date of Patent: Jun. 24, 2014

(54) CROSS-CONNECTED, SERVER-BASED, IP-CONNECTED, POINT-TO-POINT CONNECTIVITY

(75) Inventor: Harold M. Jarrett, Jr., Jefferson, GA (US)

(73) Assignee: Omnimetrix, LLC, Buford, GA (US)

( * ) Notice: Subject to any disclaimer, the term of this patent is extended or adjusted under 35 U.S.C. 154(b) by 357 days.

(21) Appl. No.: 12/462,388

(22) Filed: Aug. 3, 2009

(51) Int. Cl.
*H04L 29/06* (2006.01)

(52) U.S. Cl.
USPC ............ 726/12; 726/3; 726/4; 726/5; 726/11; 726/13; 726/14; 726/15; 726/21; 713/150; 713/151; 713/182; 709/217; 709/218; 709/219; 709/223; 709/227

(58) Field of Classification Search
USPC ............................ 726/2–15, 21; 709/217–229; 713/150–154, 168–171, 182–186
See application file for complete search history.

(56) References Cited

U.S. PATENT DOCUMENTS

| | | | | |
|---|---|---|---|---|
| 6,003,084 A * | 12/1999 | Green et al. | .................. | 709/227 |
| 7,590,710 B1 * | 9/2009 | Kokal et al. | .................. | 709/219 |
| 2002/0023143 A1 * | 2/2002 | Stephenson et al. | .......... | 709/218 |
| 2002/0143922 A1 * | 10/2002 | Tanimoto | ...................... | 709/223 |
| 2002/0143956 A1 * | 10/2002 | Tanimoto | ...................... | 709/227 |
| 2003/0046580 A1 * | 3/2003 | Taniguchi et al. | ............ | 713/200 |
| 2003/0191848 A1 * | 10/2003 | Hesselink et al. | ............ | 709/229 |
| 2003/0208524 A1 * | 11/2003 | Morman et al. | ............. | 709/201 |
| 2005/0138186 A1 * | 6/2005 | Hesselink et al. | ............ | 709/229 |
| 2007/0143837 A1 * | 6/2007 | Azeez et al. | ..................... | 726/11 |
| 2008/0109098 A1 * | 5/2008 | Moshier et al. | ............... | 700/103 |
| 2008/0162929 A1 * | 7/2008 | Ishikawa et al. | .............. | 713/160 |
| 2010/0268832 A1 * | 10/2010 | Lucas et al. | ................... | 709/228 |

OTHER PUBLICATIONS

Microsoft Dictionary by Microsoft Corporation; Publisher: Microsoft Press; year: 2002.*

* cited by examiner

*Primary Examiner* — Madhuri Herzog
(74) *Attorney, Agent, or Firm* — Kenneth W. Float

(57) ABSTRACT

Apparatus, methods and software that implement cross-connected, server-based, IP-connected, point-to-point connectivity between remotely located firewall-protected devices. The apparatus, methods, and software allow user computers to communicate with remotely located firewall-protected devices that without the necessity to configure the firewalls. The apparatus methods, and software are implemented using a relay server that runs software that implements communication between an arbitrary number of firewall-protected devices and an arbitrary number of firewall-protected user computers that are remotely-located from the devices.

21 Claims, 3 Drawing Sheets

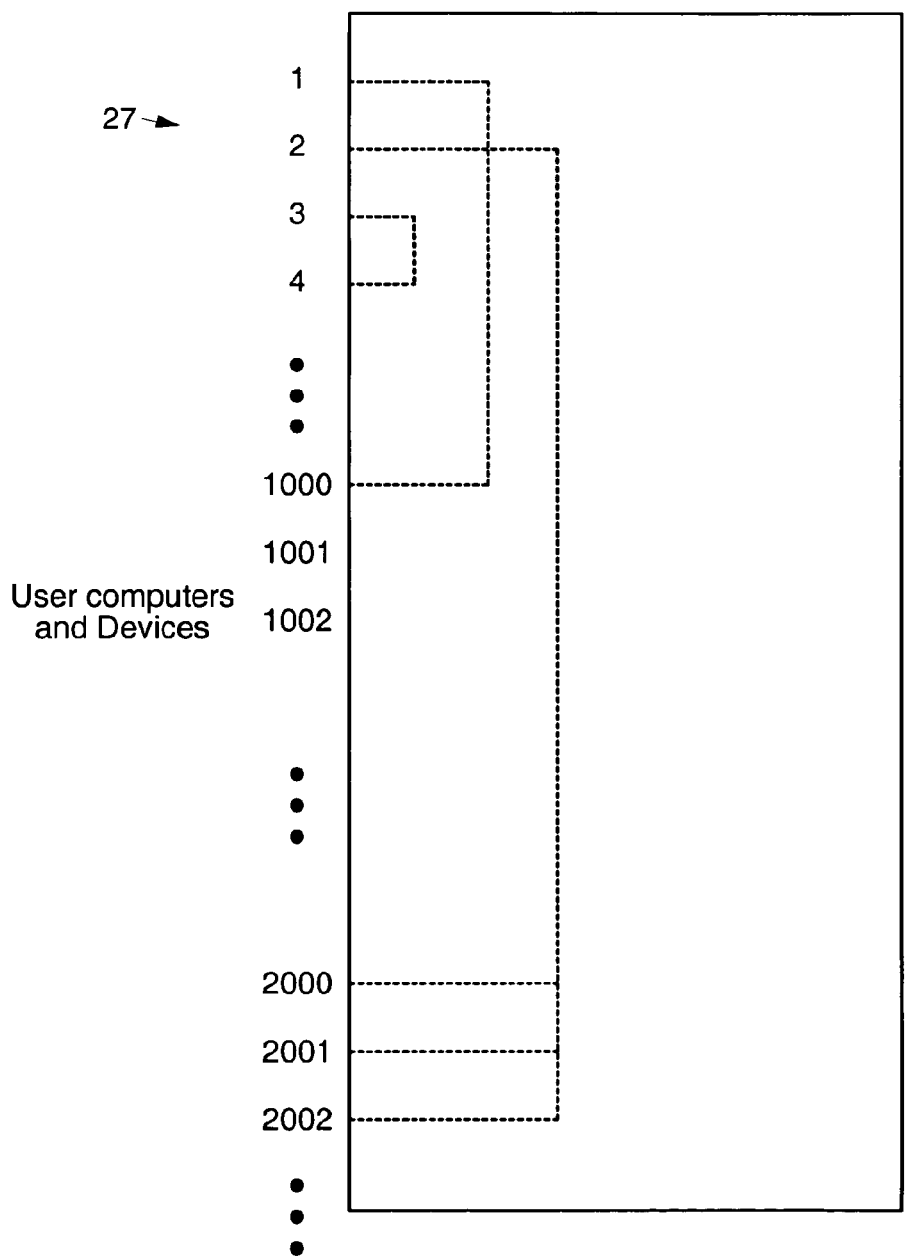

CROSS-CONNECTED, SERVER-BASED, IP-CONNECTED, POINT-TO-POINT CONNECTIVITY

BACKGROUND

The present invention relates generally to apparatus, methods and software that allow users to communicate with remotely located isolated equipment or devices that are located behind a firewall or isolation device without the necessity to configure the firewall or isolation device to permit communication. More particularly, the present invention relates to apparatus, methods and software that employ a relay server to provide communication between an arbitrary number of isolated devices and an arbitrary number of remote protected users. The present invention implements cross-connected, server-based, IP-connected point-to-point connectivity between remotely located firewall-protected devices.

For years, electronic equipment has been designed with serial data ports so that users can connect to the equipment with a computer and configure or use the equipment. The most common serial data connection for years has been the RS232 port, in which there is a Transmit Data wire (Tx), a Receive Data wire (Rx), and a ground wire that provides a common reference voltage between the equipment and other attached devices. RS232 devices commonly allow transmission and reception of data simultaneously, and this process is called full duplex operation. A principal shortcoming of RS232 devices is the practical limitation on working cable length, of approximately 100 feet. This means that in basic application, RS232 devices cannot be separated by more than about 100 feet. In order to increase the working distance between devices, other serial data communication methods were adopted, including RS422 which is a 4-wire design allowing full duplex transmission over thousands of feet, and RS485 which is a 2-wire, half duplex design capable of similar distances, but with the necessity to alternate between transmission and reception. Recently, serial ports have been replaced by Universal Serial Bus (USB) ports. However, USB ports can only operate on the order of 10 feet or so, which is less performance than the RS232 ports it is designed to replace. Thus, USB ports exhibit the same problems as the RS232 ports discussed above.

As computer networks became practical, Ethernet connectivity became the dominant method, utilizing Transmission Control Protocol/Internet Protocol (TCP/IP) packetized data exchange to move data across large distances, and across the internet. At this time, a device, sometimes referred to as a serial server, or device server, came into existence. It then became possible to configure a pair of serial servers with IP addresses, and to cause them to make and maintain a TCP/IP connection between one another, and transport data presented at one unit's serial port to the other unit's serial port through TCP/IP transfer of the serial data bytes. Thus, within a factory environment with an Ethernet network (typically a firewall-protected local area network), it became possible to establish serial port connections between devices in different parts of the factory, using the local area network as a replacement for the serial cable, but without the length limitation. This process of transporting the serial data bytes through the network is sometimes referred to as creating a "serial tunnel" or "tunneling."

In the computer network design described above, one serial server had to be configured to establish and maintain the TCP/IP connection to the other, and the second had to be configured to accept and receive a connection from the first. Thus they were paired to enable a point-to-point tunnel. These devices were most commonly used to connect within a single local area network, where network administrators could define and enable necessary static IP addressing, required so that the pair of devices could "find" each other.

It is possible to have one serial server behind a company's firewall, and the other device outside the firewall, but enabling this process calls for opening a route through the firewall in order for the external device to connect to the internal device. This process of opening a route, or pinhole, through the firewall is generally undesirable, as it creates a security risk for the network and an additional maintenance task for the network administrator. Thus, in general, establishing a connection from a device outside a company's firewall to another device inside the firewall is difficult and typically avoided. It is this problem that the present invention solves.

It would be desirable to have the ability to connect to and remotely communicate with and control devices that are located behind a firewall, including engine controllers, copiers, printers, wind speed indicators, and pumps having engines and engine controllers, and the like, without requiring a route to be opened in a firewall to enable communication. It would be desirable to have apparatus, methods and software that allow an arbitrary number of users to communicate with devices that are located behind a firewall without the necessity to configure the firewall to permit communication. It would be desirable to have apparatus, methods and software that implement cross-connected, server-based, IP-connected point-to-point connectivity between remotely located firewall-protected devices.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 shows a generic view of valid connections waiting for cross-connected data exchange.

DETAILED DESCRIPTION

Figure 1:
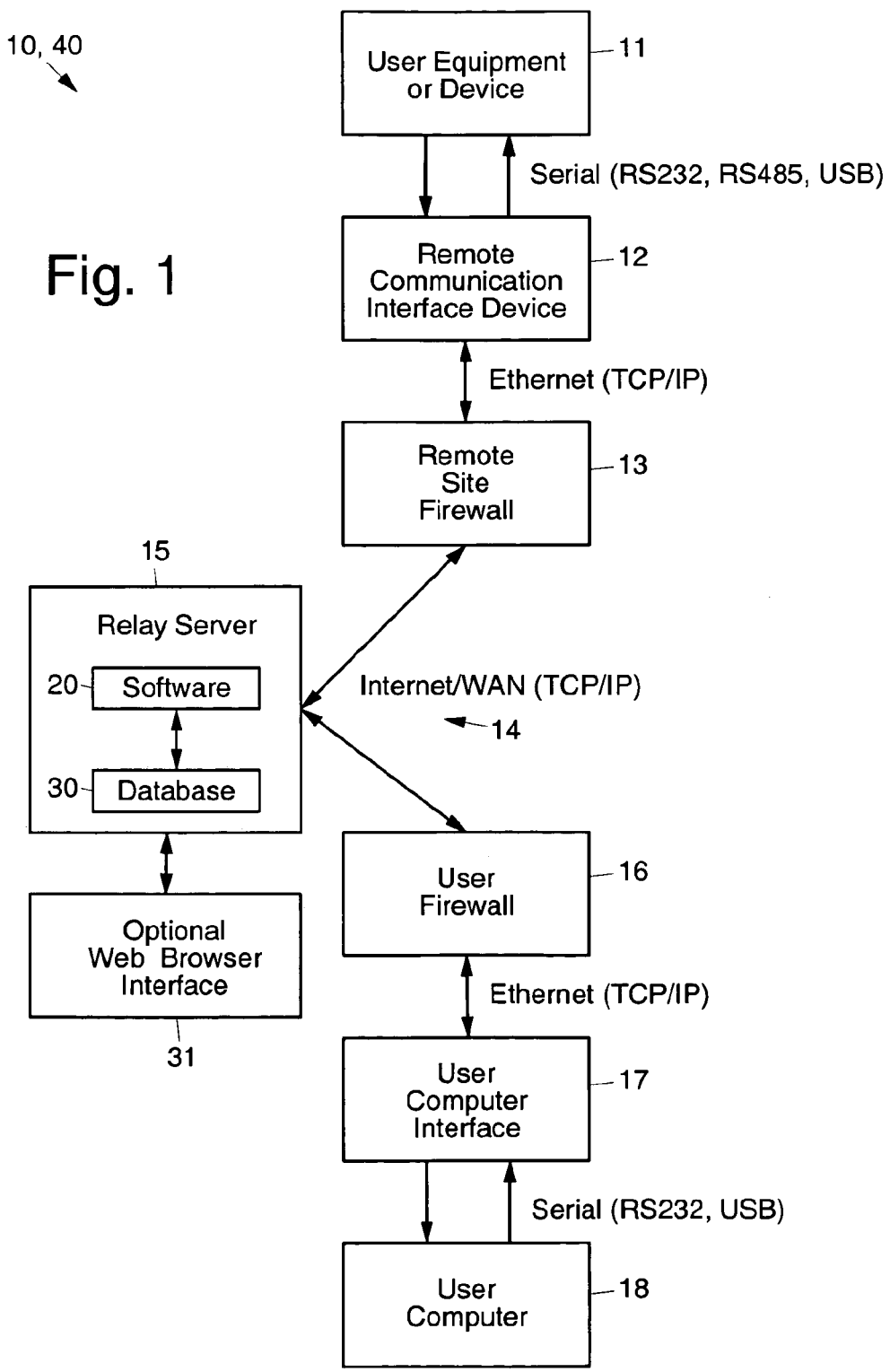
FIG. 1 is a block diagram showing exemplary apparatus and methods that allow arbitrary users to communicate with devices that are located behind a firewall without the necessity to configure the firewall to permit communication.

In the present invention, user computers and remote devices incorporate a well-known serial port tunnel configured to connect to a remote IP address, so that a connection is made from a protected side of a firewall to the outside world. By taking this approach, the firewall does not inhibit connections made by the user computers or remote devices. Since tunneling user computers or devices are set to connect to an outside world address, and not to each other, a dedicated server application is implemented to provide a standard landing point for the user computers and devices. The server accepts connections from the user computers and devices, and then cross-connects received data between connected devices. In a simple application, devices that connect to the same IP address and port are automatically cross connected. For example, a pair of devices might connect to port addresses that are different from any other pair using the server, thus defining pair connectivity. This represents the most basic concept implemented in accordance with the present invention.

The embodiment described above is fully functional, but suffers from potential security weaknesses, in that the server simply accepts any connections and patches together the data transport, without any qualification of the connecting devices. Since a common computer hacking method involves attempting to make TCP/IP connections to random ports, the server might equally well accept connections from malicious computers. Thus, in a more secure embodiment, the server implements a secure login or authentication. This requires that remote devices embody functionality beyond that of a simple serial server. In such an application, the remote devices must execute a handshake authentication with the server prior to commencing transport of serial data. If the server determines that the connected device, or malicious computer, does not perform a proper authentication, then it can instantly close the connection to the server. Once the server is satisfied that the connection is from a valid device, the cross connection of data between defined valid devices may be initiated. In order to provide an even more secure transport of data, the server and remote devices may incorporate an encryption algorithm, utilizing secret keys to assure that paired points of connection receive only data that meets the design requirement.

In the authentication handshake, the remote device may connect to a known mating device by passing a message to the server identifying itself and its mating device, thus allowing the server application to process data between the pair of devices. It is also possible for remote devices to attach to the server without a known mating device, and simply wait for a cross-connection with another device or computer with whom it should communicate. In this case, an arbitrary number of devices may be attached to the server, and a user who desires to connect to one of the devices may make a similar server connection with the server application making the required cross-connection between the user and remote device. It is equally possible to have the identity of the destination remote device be part of a user's computer connection authentication, or to have the user computer simply attach in the same manner as other devices and to have the server make the association between the desired devices. For example, the server may present a web page interface that allows the user to select connection pairs so that remote devices and user computers need not have knowledge of the desired mating device.

It should be noted that while the above discussion has focused on pairs of devices or computers, there is no implied restriction that only pairs may be cross-connected. Other rules allowing multiple devices to join the same connection, then, enable a multi-drop networking environment of an arbitrary number of remotely distributed devices or computers.

With the above description in mind, the following discussion presents exemplary embodiments of the present invention. Referring to the drawing figures, FIG. 1 illustrates apparatus 10 and methods 40 that implement cross-connected, server-based, IP-connected, point-to-point connectivity between remotely located firewall-protected equipment or devices 11 and/or user computers 18. More particularly, FIG. 1 illustrates apparatus 10 and methods 40 that allow arbitrary (firewall-protected) user computers 18 to communicate with user devices 11 that are located behind device firewalls 13 (remote site firewalls 13) without reconfiguring the firewall 13 to permit communication. The apparatus 10 and methods 40 do not require opening a dedicated route through remote site or user firewalls 13, 16 to permit communication.

An exemplary user device 11 may be an engine controller that controls a standby power generator, commonly known as a GENSET. The exemplary user device 11 may also be a copier, a printer, or a wind speed indicator, for example. The engine controller user device 11 may comprise a serial communication port 11a, or interface 11a. The serial communication port 11a, or interface 11a, may comprise a serial communication port, such as RS232, RS485, controller area network (CAN) bus, for example. Alternatively, the interface 11a may comprise an Ethernet interface. The present invention will be described below with reference to its use with a standby power generator (user device 11) having a serial communication interface 11a.

The serial communication port 11a, or interface 11a, of the user equipment 11 (engine controller) is coupled to a remote communication interface device 12, or user device interface 12. The remote communication interface device 12 functions as a serial-to-Ethernet (TCP/IP) converter. The remote communication interface device 12 may comprise a remote annunciator 12. An exemplary remote annunciator 12 that may be used with the exemplary apparatus 10 and methods 40 is disclosed in U.S. patent application Ser. No. 11/120,779, filed May 3, 2005, now U.S. Pat. No. 8,224,499, the contents of which are incorporated herein by reference in their entirety. Alternatively, an exemplary remote communication interface device 12 referred to as a serial-to-Ethernet device server, is manufactured by Lantronix, located in Irvine, Calif., under the trade name DeviceLinx. However, the Lantronix device does not implement authentication.

The remote annunciator 12 disclosed in U.S. patent application Ser. No. 11/120,779, now U.S. Pat. No. 8,224,499, operates in either a server-assigned (DHCP) IP addressing or static IP addressed mode. The DHCP method allows simple plug and play installation, while assignment of a static IP address to the remote annunciator 12 requires a few minutes of set up on site. The remote annunciator 12 is designed to deliver data that it receives from the user device 11, such as the GENSET, to user computers 18. This is achieved by the methods previously described.

The remote communication interface device 12 is coupled to and protected by a remote site firewall 13. The remote site firewall 13 isolates and protects user devices 11 from access by devices or computers located outside the remote site firewall 13. However, the remote site firewall 13 permits connection from the remote communication interface device 12 to external devices so that data can be sent to other external devices or computers for storage or analysis, for example. However, because the remote site firewall 13 does not permit access to the remote communication interface device 12 or to the user device 11 from computers located outside the local area network it protects, remotely-located users cannot readily communicate the user device 11, such as the engine controller, for example, except by the methods implemented in accordance with the present invention.

Routing through the remote site firewall 13 from the outside can only be done if the user device firewall 13 is manually configured to provide access to a specific port that the remotely-located user connects to. An enterprise normally does not want to do this because of local area network security issues.

In order to overcome this problem, the exemplary apparatus 10 and methods 40 use a relay server 15. The relay server 15 is coupled to the user device firewall 13 by way of a public wide area network 14, such as the Internet 14. The relay server 15 is also coupled to a user firewall 16 by way of the public wide area network 14, or Internet 14. Internet connectivity may also be implemented using a cellular Internet connection or a satellite Internet connection, in lieu of the Ethernet connection.

The user computer 18 has a serial interface 18a coupled to the user device firewall 13 by way of a user computer interface 17. The user computer interface 17 functions as a serial-to-Ethernet (TCP/IP) converter, in a manner similar to the remote communication interface device 12. In the case of the engine controller embodiment, the user computer 18 embodies user device-specific software that is designed to access and control the user device 11 (i.e., engine controller). The user computer 18 may also embody the functionality of the user computer interface 17 and thus include a serial-to-Ethernet (TCP/IP) converter in lieu of using the user computer interface 17.

As is also illustrated in FIG. 1, an optional web browser interface 31 may be provided to permit access to the data located in devices 11 from the user computers 18. Using the optional web browser interface 31, users may access the data located in a device 11 by way of the Internet 14. This browser interface may optimally be a method of cross-connection control discussed below.

The relay server 15 comprises cross-connection software 20 and a database 30 that cooperate to implement point-to-point cross-connection between an arbitrary number of user computers 18 and an arbitrary number of remote user devices 11. The database 30 may be used to store login identities of authenticated devices 11 and user computers 18.

Figure 2:
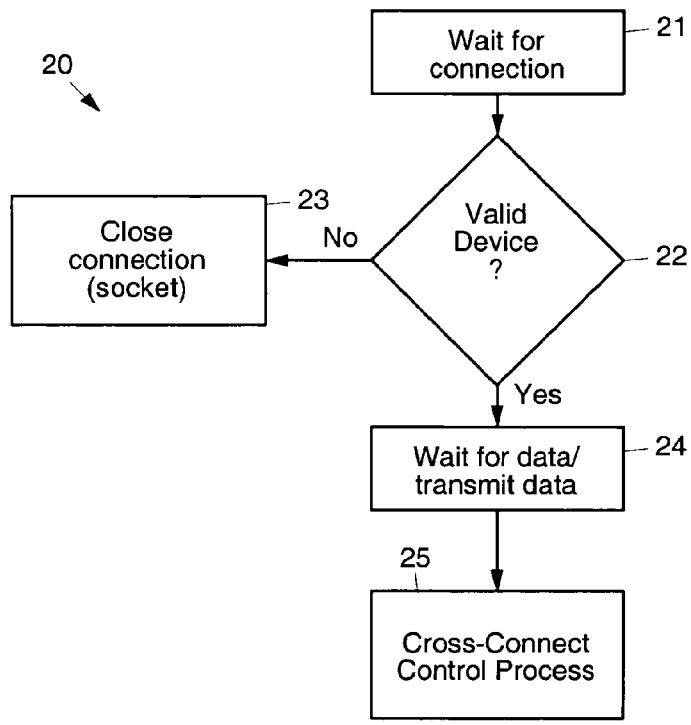
FIG. 2 is a software flow diagram associated with the apparatus and methods shown in FIG. 1.

FIG. 2 is a flow diagram illustrating exemplary software 20 used in conjunction with the apparatus 10 and methods 40. The software 20 is operative to implement the point-to-point cross-connection between the user computers 18 and the user devices 11.

As shown in FIG. 2, the cross connection software application waits 21 for and accepts TCP/IP connections on designated ports. Upon acceptance of the connection, the application implements a login-authentication process 22 with the device 11 or computer 18 connecting to it. This login-authentication process 22 is optional, but is recommended so as to protect the server 15 from malicious connections. The login-authentication process 22 may be as simple as a recognizable character string from the remote devices 11 or computers 18, potentially protected by an encryption technique, or a bidirectional login process with a well-defined protocol.

In the login-authentication process 22, the connecting devices 11, 18 may attach in varying ways. In one implementation, the connecting devices 11, 18 may identify themselves uniquely, relying on the relay server 15 to make the cross-connection of data based on a stored rule or perhaps a web interface 31 under the control of appropriate users. For example, a user may use the web interface 31 to select from a set of devices 11, 18, associated with that user, for cross-connection. This same web control interface 31 may offer the ability to break down the connection, as well.

In a second implementation, the connecting devices 11, 18 may identify themselves and the mating device 11, 18, if the design point is to accommodate only pairs of devices 11 or computers 18. In this case, the server 15 will only cross-connect devices 11 or computers 18 with matching identities and requested connections.

In another implementation, the devices 11, 18 may utilize a "communication channel identity", without the necessity of identifying themselves uniquely. In this case, all attached devices 11, 18 share data with one another. That is, any byte sent by one device 11, 18 on that channel will be received by all other devices 11, 18 on that channel. This topology is useful when networking multiple serial devices 11, 18 together, an otherwise difficult process. Note that the devices 11, 18 must be programmed to request a specific channel in order to selectively connect those devices 11, 18.

By way of example, upon connection, the server software 20 might send a string to the connecting device 11 such as "Ready:123456789" where "123456789" is an encrypted string that the device 11 can decode and reply to with a string such as "Connect:987654321" where the server software 20 can recognize that the returned string properly matches the expected string, based on their mutual programming. If the return string is a mismatch from what is expected, the server software 20 can close 23 the socket connection. If it is a match, then the server software 20 can move that connection into an application thread where it waits 24 for data exchange with another cross-connected device 11 or computer 18 using a cross-connection control process 25.

As long as the server 15 allows the cross-connection control process 25 to operate, data between the cross connected devices 11 and/or computers 18 will be transferred bidirectionally, with minimal latency. The cross connection may be broken down after a defined time, or by detection of certain character strings. For example, it is common practice to use the string "+++" to break out of a data connection.

Figure 3:
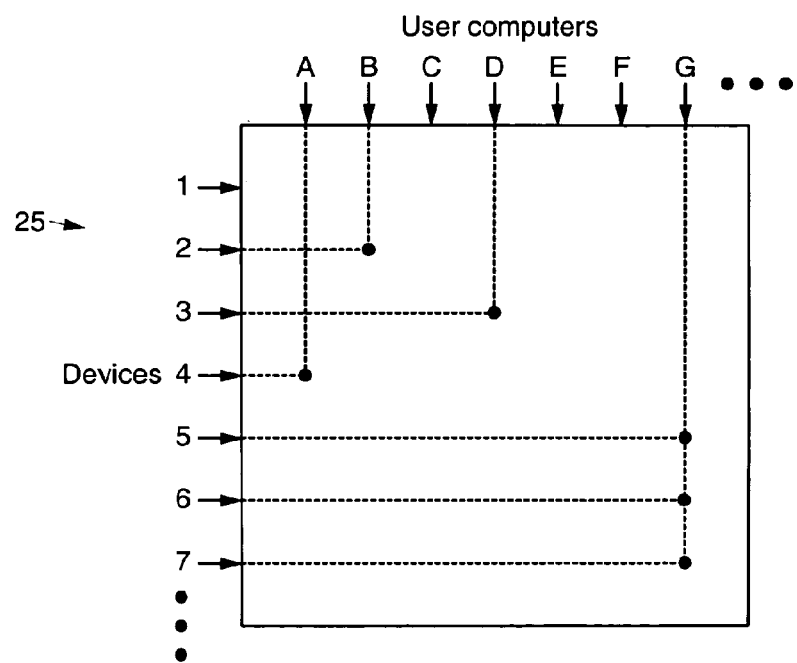
FIG. 3 illustrates an exemplary cross-connection control process that may be used in conjunction with the apparatus and methods and software shown in FIGS. 1 and 2.

FIG. 3 shows, for clarity, a matrix form of the cross connection process 25. In FIG. 3, the connecting devices are labeled Devices and Computers, since this application is common, allowing users to connect to devices 11 through their computers 18. More particularly, FIG. 3 illustrates an exemplary cross-connection control process 25 (matrix switching operation) that may be used in conjunction with the apparatus 10, methods 40 and software 20. As may be seen in FIG. 3, the cross-connection control process 25 routes data between one or more protected user computers 18 and one or more remote protected user devices 11. For example, as is shown in FIG. 3, user computer A is connected to device 4, user computer B is connected to device 2, user computer D is connected to device 3, and user computer G is simultaneously connected to devices 5-7. In addition, although not specifically shown in FIG. 3, multiple user computers 18 may be connected to a single user device 11, in the manner similar to the connection of user computer G and devices 5-7.

TCP/IP packet routing by the cross-connection software 20 and relay server 15 is performed in a manner similar to routing performed by a conventional router. However, using the cross-connection software 20 and relay server 15, routing is made between multiple user computers 18 and multiple user devices 11.

There is no requirement that the connecting devices be pairs of devices 11 and computers 18, however. It is equally possible for cross connection of computers to computers or devices to devices, or any combination thereof. FIG. 4 shows a generic view of valid connections waiting for cross-connected data exchange. These connections are not labeled as computers or devices, since there is no requirement for knowledge of the type of device connected for the process to work. As illustrated in FIG. 4, device/computer 1 is cross-connected to device/computer 1000. Device/computer 2 is cross-connected to devices/computers 2000-2002. Device/computer 3 is cross-connected to device/computer 4.

While the above discussion has referred to user computers 18 and remote user devices 11 for clarity, it is to be understood that pairs or groups of remote devices 11 may be cross-connected without a user computer 18. Likewise, pairs or groups of user computers 18 may also be cross-connected.

Thus, apparatus methods, and software that allow users to communicate with remotely located devices located behind a firewall without the necessity to configure the firewall to permit communication have been disclosed. Also, apparatus methods, and software that employ a relay server to permit communication between an arbitrary number of isolated devices and an arbitrary number of user computers have been disclosed. Furthermore, apparatus, methods and software that implement cross-connected, server-based, IP-connected, point-to-point connectivity between remotely located firewall-protected devices have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Apparatus comprising:
   a relay server;
   a plurality of devices that each comprise a serial port tunnel to implement serial communication, and that are each configured to connect to the relay server using a TCP/IP protocol over a wide area network to implement serial-to-TCP/IP conversion, that log into the relay server based upon a specific login identification protocol, and that are each configurable to transmit only TCP/IP packetized data to and from the relay server; and
   relay server software that runs on the relay server that cross-connects an arbitrary number of devices that are logged into the relay server based only upon the login identification protocol and without any connection requests subsequent to login to the relay server, and that transmits only TCP/IP packetized data between the selected devices;
   wherein the apparatus implements cross-connected, server-based, IP-connected, point-to-point and point-to-multipoint connectivity between an arbitrary number of devices.

2. The apparatus recited in claim 1 wherein the relay server and the arbitrary number of devices comprise an encryption-based login-authentication protocol.

3. The apparatus recited in claim 1 wherein the relay server software comprises:
   a code segment that waits for and accepts TCP/IP connections on designated ports;
   a code segment that implements a login-authentication process between the arbitrary number of devices;
   a code segment that closes a socket connection to a device that is not authenticated;
   a code segment that, once the arbitrary number of devices are authenticated, waits for data that is to be exchanged between cross-connected devices; and
   a code segment that transmits received data to cross-connected devices using a cross-connection control process.

4. The apparatus recited in claim 1 wherein the arbitrary number of devices uniquely identify themselves to implement the login identification protocol, and the relay server software cross-connects data based on a stored rule.

5. The apparatus recited in claim 1 wherein the arbitrary number of devices uniquely identify themselves using a web interface to implement the login identification protocol, and the relay server software cross-connects data based on data input via the web interface.

6. The apparatus recited in claim 1 wherein the arbitrary number of devices have matching identities and identify requested connections to implement the login identification protocol, and the relay server software cross-connects data based on matching identities and the requested connections.

7. The apparatus recited in claim 1 wherein the relay server software comprises a matrix switching operation that cross-connects multiple arbitrary numbers of devices.

8. The apparatus recited in claim 1 wherein each of the plurality of devices comprise:
   a serial interface; and
   a serial-to-TCP/IP tunneling device for converting between serial data and TCP/IP data;
   which serial interface and tunneling device comprise the serial port tunnel.

9. The apparatus recited in claim 1 wherein all devices identify themselves to implement the login identification protocol and devices having identical login identities are cross-connected by the relay server software.

10. The apparatus recited in claim 1 further comprising a web browser interface for accessing data in the plurality of devices and for accessing a relay server database containing devices connected to the relay server to cross-connect selected devices.

11. A method, comprising:
    providing a relay server;
    providing a plurality of devices that each comprise a serial port tunnel to implement serial communication, and that are each configured to connect to the relay server using a TCP/IP protocol over a wide area network to implement serial-to-TCP/IP conversion, that log into the relay server based upon a specific login identification protocol, and that are each configurable to transmit only TCP/IP packetized data to and from the relay server; and
    communicating between the plurality of devices using relay server software that runs on the relay server by cross-connecting an arbitrary number of the devices that are logged into the relay server based only upon the login identification protocol and without any connection requests subsequent to login to the relay server, and transmitting only TCP/IP packetized data between the devices, to implement cross-connected, server-based, IP-connected, point-to-point and point-to-multipoint connectivity between the arbitrary number of devices.

12. The method recited in claim 11 further comprising communicating between the devices and the relay server using a secure login-authentication protocol.

13. The method recited in claim 11 wherein all devices identify themselves to implement the login identification protocol and devices having identical login identities are cross-connected by the relay server software.

14. The method recited in claim 11 wherein the arbitrary number of devices uniquely identify themselves to implement the login identification protocol, and the relay server software cross-connects data based on a stored rule.

15. The method recited in claim 11 wherein the arbitrary number of devices uniquely identify themselves using a web interface to implement the login identification protocol, and the relay server software cross-connects data based on data input via the web interface.

16. The method recited in claim 11 wherein the arbitrary number of devices have matching identities and identify requested connections to implement the login identification protocol, and the relay server software cross-connects data based on matching identities and the requested connections.

17. The method recited in claim 11 wherein the relay server software:
    waits for and accepts TCP/IP connections on designated ports;
    implements a login-authentication process between the arbitrary number of devices;

closes a socket connection to a device that is not authenticated;

once the arbitrary number of devices are authenticated, waits for data that is to be exchanged between cross-connected devices; and transmits received data to cross-connected devices using a cross-connection control process.

18. Software embodied on non-transient media for use with a relay server and a plurality of devices comprising:

one or more code segments that respectively connect each of the plurality of devices to the relay server using a serial port tunnel to implement serial communication, and is configured to implement a TCP/IP protocol over a wide area network to provide serial-to-TCP/IP conversion;

one or more code segments that respectively log the plurality of devices into the relay server based only upon a specific login identification protocol;

one or more code segments that cross-connect an arbitrary number of devices that are logged into the relay server that have matching login identities defined by the login identification protocol and without any connection requests subsequent to login to the relay server to implement cross-connected, server-based, IP-connected, point-to-point and point-to-multipoint connectivity between the arbitrary number of devices; and one or more code segments that transmit only TCP/IP packetized data between the arbitrary number of devices that have matching login identities by way of the relay server.

19. The software recited in claim 18 which further comprises:

one or more code segments that implement serial port tunnels on each of the arbitrary number of devices.

20. The method recited in claim 11 wherein all devices are each configurable to connect to the relay server via the serial port tunnel.

21. The apparatus recited in claim 1 wherein devices use communication channel identity without identifying themselves uniquely to implement the login identification protocol and devices having matching communication channels are cross-connected by the relay server software.

* * * * *